(12) United States Patent
Murahashi et al.

(10) Patent No.: US 8,108,101 B2
(45) Date of Patent: Jan. 31, 2012

(54) LUBRICATING OIL COOLING DEVICE FOR TRAVELING SPEED REDUCTION GEAR

(75) Inventors: Takayoshi Murahashi, Tsuchiura (JP); Toshikazu Minoshima, Kasumigaura (JP); Takao Kurosawa, Usiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 263 days.

(21) Appl. No.: 12/615,529

(22) Filed: Nov. 10, 2009

(65) Prior Publication Data
US 2010/0187042 A1 Jul. 29, 2010

(30) Foreign Application Priority Data
Jan. 28, 2009 (JP) ................................. 2009-016243

(51) Int. Cl.
*B60K 17/14* (2006.01)
*B60K 11/02* (2006.01)
(52) U.S. Cl. .................... 701/36; 180/65.6; 180/339
(58) Field of Classification Search .................... 701/36, 701/50; 180/339, 65.6, 65.7; 192/113.3, 192/70.12
See application file for complete search history.

(56) References Cited

U.S. PATENT DOCUMENTS

| 2008/0296121 A1* | 12/2008 | Miyazaki et al. .......... 192/113.3 |
| 2009/0312145 A1* | 12/2009 | Pohl et al. ........................ 477/37 |
| 2011/0146602 A1* | 6/2011 | Kato ........................... 123/90.12 |

FOREIGN PATENT DOCUMENTS

| JP | 62-221918 A | 9/1987 |
| JP | 2006-264394 A | 10/2006 |

* cited by examiner

*Primary Examiner* — Ruth Ilan
(74) *Attorney, Agent, or Firm* — Mattingly & Malur, PC

(57) ABSTRACT

A traveling speed reduction gear lubricating oil cooling device has a temperature sensor for detecting the temperature of lubricating oil to be installed outside a wheel mounting sleeve without running the risk of damage to a lubricating oil pump in a cold work environment. A startup operation reference speed lower than a reference speed for normal operation is set so as to ensure that air intake does not occur. A startup operation comparison device compares the speed detected by a speed sensor with the startup operation reference speed. If the detected speed is lower than the startup operation reference speed, a drive motor for the lubricating oil pump is engaged in operation at a speed lower than a normal operation speed. If the detected speed is higher than the startup operation reference speed, the drive motor for the lubricating oil pump is turned off.

4 Claims, 14 Drawing Sheets

LUBRICATING OIL COOLING DEVICE FOR TRAVELING SPEED REDUCTION GEAR

TECHNICAL FIELD

The present invention relates to a traveling speed reduction gear lubricating oil cooling device ideal for work vehicles such as large dump trucks used to carry, for instance, crushed rock excavated from mines or the like, and more specifically, it relates to a device that engages a lubricating oil cooling device during a work vehicle startup operation.

BACKGROUND ART

A dump truck is a type of carrier vehicle that is normally equipped with a body disposed on the truck frame. The body, which can hold a heavy load, such as crushed rock, can be tilted in order to dump its contents. A traveling drive device that drives the drive wheels of the dump truck includes a tubular motor housing sleeve attached to the chassis and a drive motor such as an electric motor or a hydraulic motor that is disposed inside the motor housing sleeve and rotationally drives a rotating shaft. In addition, a tubular spindle is disposed toward the front end of the motor housing sleeve with a wheel mounting sleeve rotatably mounted via a bearing at the outer circumference of the tubular spindle. Wheels are fixed onto the exterior of the wheel mounting sleeves. A traveling speed reduction gear unit that slows down the rotation of the drive motor and transmits the slowed rotational force to the wheel mounting sleeve (wheels) and the like are disposed inside the wheel mounting sleeve (see, for instance, Japanese Laid Open Patent Publication No. S62-221918 and Japanese Laid Open Patent Publication No. 2006-264394).

Lubricating oil used to keep the various gears and the like constituting the reduction gear mechanism in a lubricated state is collected inside the wheel mounting sleeve at which traveling wheels are mounted. As the vehicle travels, the temperature of the lubricating oil rises and the viscosity of the lubricating oil is reduced, resulting in a lower level of lubrication performance. In order to sustain the lubrication performance at a desired level and prevent degradation of the lubricating oil, the lubricating oil is forcibly circulated to travel into and out of the wheel mounting sleeve via a lubricating oil pump disposed outside the wheel mounting sleeve and the lubricating oil is cooled by an oil color disposed in the middle of the circulation path.

An intake piping is connected to the intake side of the lubricating oil pump and the intake piping is inserted through the wheel mounting sleeve. An intake port of the intake piping, positioned so as to face toward the bottom surface of the wheel mounting sleeve, extends to a position at which it is immersed under the surface of the lubricating oil in the wheel mounting sleeve. A supply piping is connected to the outlet side of the lubricating oil pump. This supply piping, too, is inserted through the wheel mounting sleeve so as to supply the lubricating oil from the lubricating oil pump into the wheel mounting sleeve.

DISCLOSURE OF THE INVENTION

In the traveling drive device for a work vehicle such as a large dump truck in the related art, the reduction gear lubricating oil, having become heated during a sustained traveling operation needs to be cooled, as described above. Accordingly, a lubricating oil pump and an oil cooler are disposed within the motor housing sleeve housing the traveling motor. The lubricating oil pump draws out the lubricating oil from the wheel mounting sleeve via the circulation path, the lubricating oil having been output through the lubricating oil pump is cooled at the oil cooler and the lubricating oil is then allowed to flow back into the wheel mounting sleeve.

Such a lubricating oil cooling device must be equipped with a temperature sensor that detects a rise in the lubricating oil temperature. The temperature sensor may be installed within the wheel mounting sleeve so as to directly detect the lubricating oil temperature and thus detect the level of actual lubrication function it provides for the reduction gear unit. However, if the temperature sensor installed in the wheel mounting sleeve for direct lubricating oil temperature detection malfunctions, the temperature sensor will have to be removed by disengaging the wheels from the wheel mounting sleeve and also removing the traveling motor from the wheel mounting sleeve. Since the wheels of the large work vehicle are heavy and large, measuring up to, for instance, 4 m in diameter, the replacement process is bound to be a costly process, requiring a significant length of time and significant labor. In addition, since the work vehicle is idle while the temperature sensor is being replaced, the overall economic loss will be considerable.

For these reasons, it is not feasible to install the temperature sensor in the wheel mounting sleeve and, as an alternative, the temperature sensor may be installed in the lubricating oil circulation path outside the wheel mounting sleeve. However, the following issues must be addressed when the work vehicle with the temperature sensor installed outside the wheel mounting sleeve is used in a low temperature environment, e.g., at high elevation locations with altitude of 4000 m or higher, in regions with cold climate, or during winter in regions with relatively high latitudes. Namely, as the work vehicle travels and the temperature of the lubricating oil within the wheel mounting sleeve where the lubricating oil is actually used to lubricate the reduction gears and the like rises, the temperature sensor installed outside the wheel mounting sleeve detects a relatively low temperature close to the temperature of the surrounding environment instead of the temperature of the lubricating oil at the site of lubrication.

The lubricating oil pump in the device in the related art is designed on the premise that it is engaged in operation to circulate the lubricating oil into and out of the wheel mounting sleeve only when the lubricating oil temperature has risen to a level equal to or above, for instance, 70° C. and the lubricating oil is made to travel through the oil cooler so as to be cooled during the circulation process. As described earlier, even when the temperature of the lubricating oil inside the wheel mounting sleeve has risen significantly, the temperature sensor installed outside the wheel mounting sleeve will detect a lower temperature corresponding to the ambient temperature instead of the lubricating oil temperature inside the wheel mounting sleeve. In other words, even as the lubricating oil inside the wheel mounting sleeve is heated to a level that requires cooling, the temperature detected by the temperature sensor installed outside the wheel mounting sleeve may not detect the temperature increase and, as a result, the heated lubricating oil may be allowed to overheat. If the heated lubricating oil is left inside the wheel mounting sleeve, it will remain overheated, the lowered viscosity will compromise its lubrication performance and the quality of the lubricating oil will be degraded.

As a means for detecting a temperature close to the temperature of the lubricating oil inside the wheel mounting sleeve by addressing the issues described above arising when the temperature sensor is installed in the circulation path outside the wheel mounting sleeve, the lubricating oil pump may be caused to rotate even when the temperature detected by the temperature sensor is low, so as to draw the lubricating oil in the wheel mounting sleeve to the outside of the wheel mounting sleeve.

However, the lubricating oil with high viscosity, e.g., #90 or #140 is typically used in large work vehicles in which large loads are applied to the gears in the reduction gear unit, in order to withstand such large loads. The high viscosity lubricating oil assumes low fluidity at low temperature, equivalent to that of honey or somewhere between the fluidity of honey and that of starch syrup. This means that in a cold environment where the temperature may go down to −20° C. or lower, the load on the lubricating oil pump becomes exceedingly large and, under such circumstances, the lubricating oil pump can no longer rotate at the rated rotation rate. Even if the lubricating oil pump manages to rotate, the excessive fluid resistance of the lubricating oil may set the lubricating oil pump, driven by an electric motor under inverter control, into an OFF state due to an inverter error.

Accordingly, the lubricating oil pump may be driven at low speed so as to circulate the lubricating oil slowly once it can be reasonably assumed that the temperature of the lubricating oil inside the wheel mounting sleeve has risen to a certain level and the viscosity of the lubricating oil has been considerably lowered. However, as the wheel mounting sleeve is caused to rotate by engaging the work vehicle in traveling operation, the lubricating oil inside the wheel mounting sleeve travels upward along the inner wall of the wheel mounting sleeve. During this process, the surface level of the lubricating oil collected at the bottom of the wheel mounting sleeve may become lower than the intake port of the intake piping at the lubricating oil pump, inducing air intake through the intake port as the lubricating oil pump operates and ultimately inducing cavitation at the lubricating oil pump. The lubricating oil having traveled up along the inner wall of the wheel mounting sleeve does not flow downward readily when the temperature inside the wheel mounting sleeve is lower and the viscosity of the lubricating oil is higher. This means that the cavitation attributable to the air intake will occur more readily in a colder work environment. Cavitation at the lubricating oil pump hastens wear of seals, bearings and the like at the lubricating oil pump and leaves them more susceptible to damage.

An object of the present invention, having been completed by addressing the issues discussed above, is to provide a traveling speed reduction gear lubricating oil cooling device that allows the lubricating oil temperature sensor to be installed outside the wheel mounting sleeve without inducing damage and the like to the lubricating oil pump and the like in a cold work environment.

The present invention provides a traveling speed reduction gear lubricating oil cooling device in a work vehicle that includes:

tubular wheel mounting sleeves that rotate as one with the wheels of the work vehicle;

traveling motors used to drive the wheel mounting sleeves;

a reduction gear unit housed inside each wheel mounting sleeve and constituted with a gear mechanism that slows the rotation of the traveling motor and transmits the slowed rotation to the wheel mounting sleeve; and a circulation path and a lubricating oil pump disposed outside the wheel mounting sleeve, via which the reduction gear lubricating oil drawn out of the wheel mounting sleeve is cooled at an oil cooler and then made to travel back into the wheel mounting sleeve.

The traveling speed reduction gear lubricating oil cooling device in the work vehicle described above comprises:

a speed sensor that detects the speed of the traveling motor;

a reference speed setting means for setting in advance a reference speed Vh, at which the lubricating oil pump is stopped in order to prevent air intake at the lubricating oil pump during normal operation and a startup operation reference speed Vc lower than the reference speed Vh at which the lubricating oil pump is stopped so as to prevent air intake at the lubricating oil pump during a startup operation;

a speed comparison means for comparing the speed V detected by the speed sensor with the startup operation reference speed Vc set for the traveling motor; and a startup operation control means for engaging a drive motor for the lubricating oil pump at a speed lower than a normal operation speed if the detected speed V is lower than the startup operation reference speed Vc and stopping the drive motor for the lubricating oil pump if the detected speed V is higher than the startup operation reference speed Vc.

The reference speed Vh and the reference speed Vc may be set so as to achieve a relationship expressed as; $Vc=\alpha \times Vh$ ($\alpha=0.4\sim0.6$) in the traveling speed reduction gear lubricating oil cooling device according to the present invention.

In addition, in the traveling speed reduction gear lubricating oil cooling device according to the present invention, a startup operation reference speed $Vc1$ at which engagement of the lubricating oil pump is stopped and a startup operation reference speed $Vc2$ lower than the reference speed $Vc1$, at which the engagement of the lubricating oil pump is resumed, may be set as the startup operation reference speed Vc for the lubricating oil pump, by ensuring that their difference $\Delta=Vc1-Vc2$ satisfies a condition expressed as;

$$\Delta=\beta \times Vc1 (\beta=0.1\sim0.2).$$

The present invention has been conceived on the premise that during the work vehicle startup operation, the lubricating oil pump is engaged in operation at low speed in order to circulate the lubricating oil inside the wheel mounting sleeve via the lubricating oil pump. In addition, by assuming that the lubricating oil temperature is low during the startup operation, the startup operation reference speed used as a criterion for stopping the lubricating oil pump is set lower than the normal operation reference speed so as to allow the lubricating oil pump to operate without cavitation under the optimal conditions for the startup operation during which the lubricating oil temperature remains low.

Namely, while the temperature of the lubricating oil inside the wheel mounting sleeve is low, the viscosity of the lubricating oil is high compared to the lubricating oil viscosity during normal operation and thus, the lubricating oil traveling up along the inner wall of the wheel mounting sleeve as the work vehicle travels does not flow down toward the bottom readily. Accordingly, the traveling motor startup operation reference speed at which the lubricating oil pump is stopped while the lubricating oil temperature is still low and the lubricating oil surface level tends to become lower than the intake port of the intake piping at the lubricating oil pump during the startup operation is set to a low level, thereby ensuring that the lubricating oil pump is engaged in operation only under circumstances in which the position of the intake port can be assumed to be lower than the lubricating oil surface level to effectively prevent cavitation at the lubricating oil pump.

In addition, according to the present invention, the startup operation reference speed is set to a value equivalent to 40~60% of the normal operation reference speed as a rule of thumb, and, as a result, the lubricating oil pump can be operated in the optimal state best suited for the actual operating conditions when the lubricating oil temperature is lower than 50° C.

Furthermore, according to the present invention, the startup operation reference speed Vc2 at which the engagement of the lubricating oil pump is resumed is set with a 10~20% difference Δ relative to the startup operation reference speed Vc1 at which the engagement of the lubricating oil pump is stopped. Consequently, stable control operation can be executed without starting up/stopping the lubricating oil pump with excessive frequency.

BEST MODE FOR CARRYING OUT THE INVENTION

Figure 1:
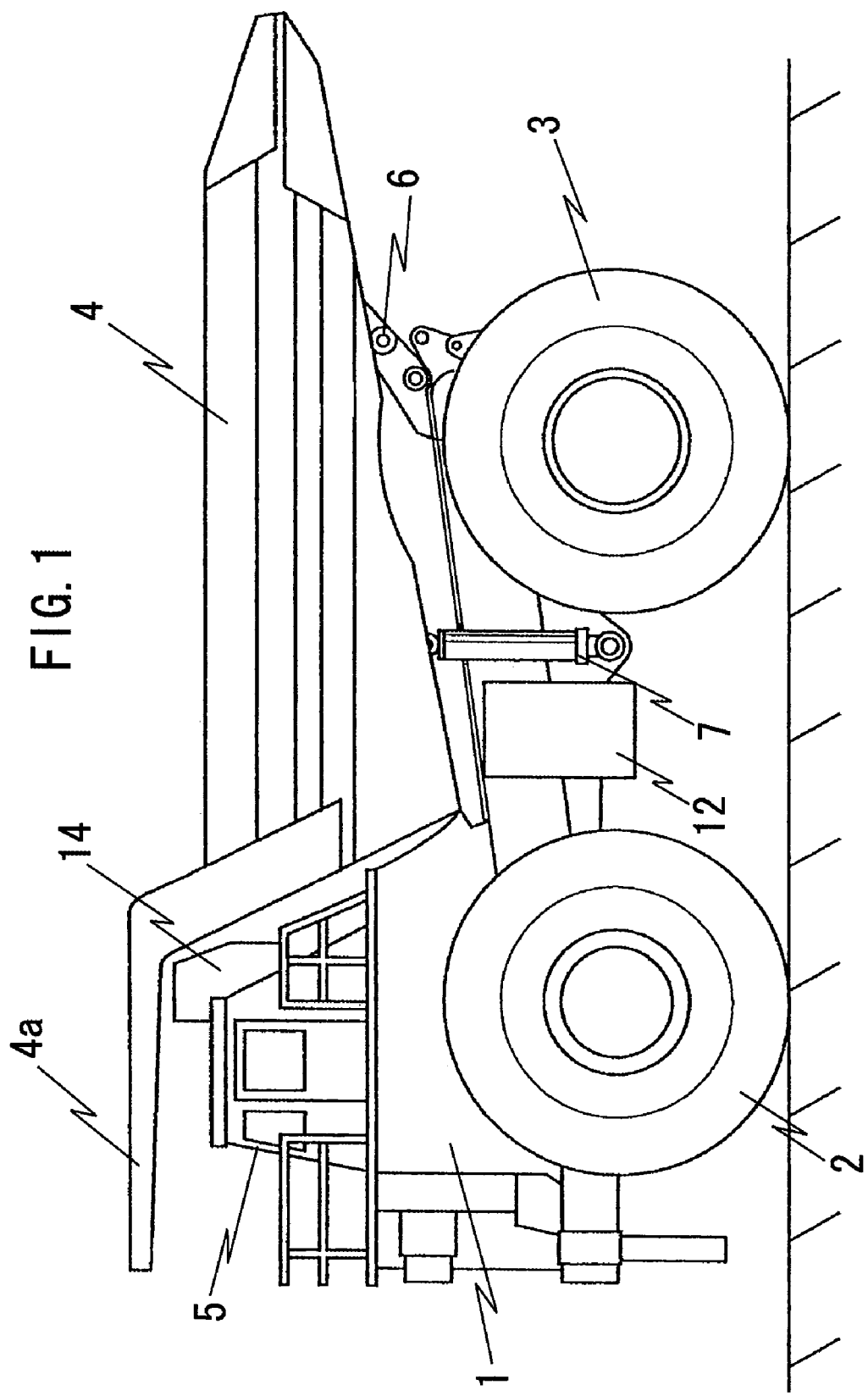
FIG. 1 is a side elevation showing a work vehicle that may adopt the present invention.

FIG. 1 is a side elevation of a large work vehicle that may adopt the present invention. The work vehicle in the example presented in the figure is a dump truck. The dump truck assuming a sturdy frame structure comprises a chassis 1 that includes front wheels 2 and rear wheels 3, a body 4 that functions as a load carrying platform and a cabin 5. The body 4 and the cabin 5 are disposed upon the chassis 1. The body 4 is a large container, the full length of which ranges 10~13 m, used to carry heavy loads such as crushed rock or coal, in large volumes. The body includes a hood 4a, formed as an integrated part thereof and located at the top thereof on the front side so as to cover the cabin 5 from above. The body 4 is tiltably mounted at the chassis 1 via a pin link unit 6 located on the rear side. Reference numeral 7 indicates a hoisting cylinder that hoists one end the body 4 up/down to tilt the body.

The front wheels 2 are steerable wheels via which the dump truck is steered by the driver. The rear wheels 3, which include two left rear wheels and two right rear wheels, constitute the drive wheels of the dump truck. The front wheels 2 and the rear wheels 3 are large wheels, the outer diameter of which may be as large as 2~4 m.

Figure 2:
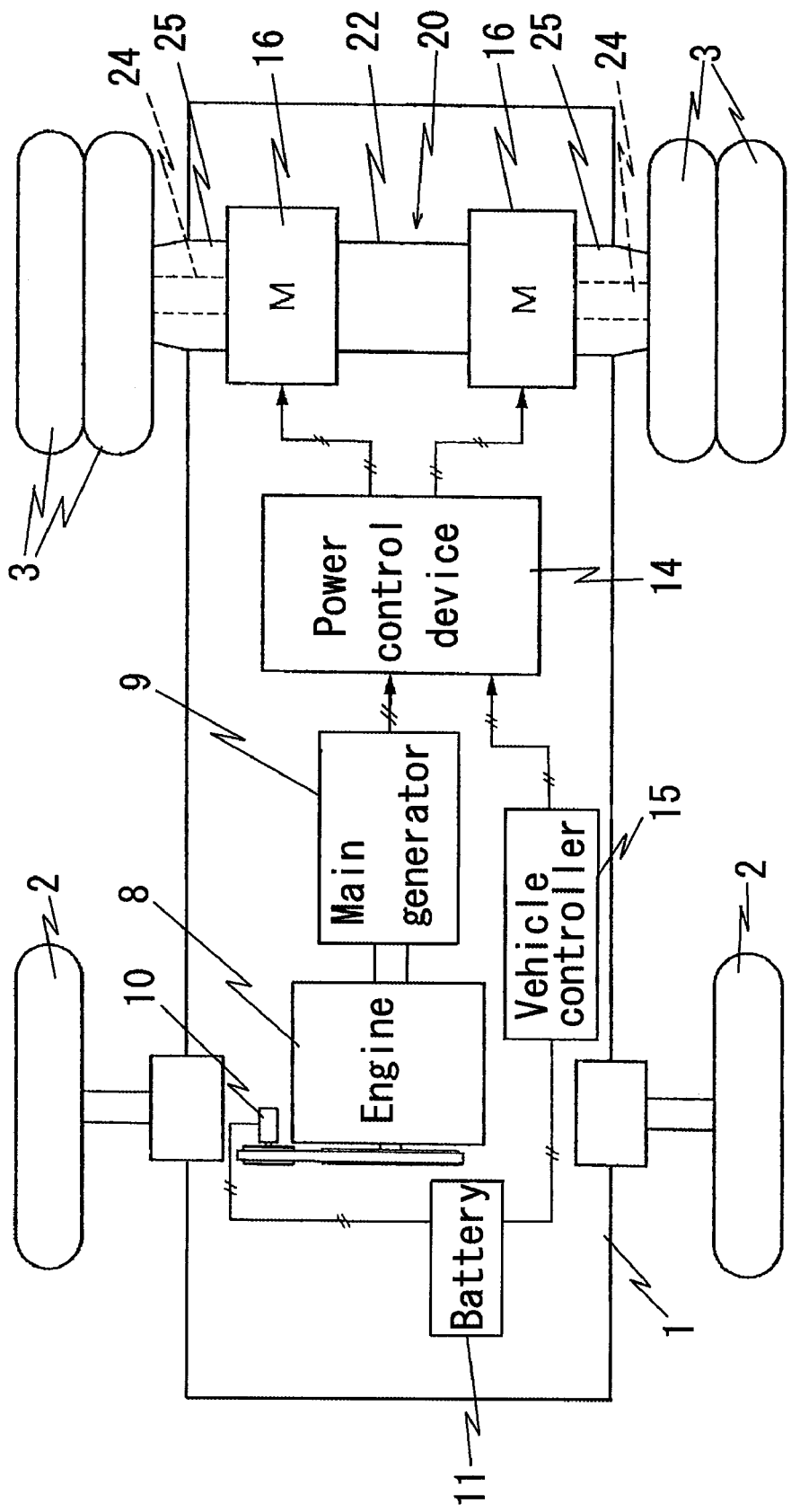
FIG. 2 is a block diagram showing the structure of a traveling drive device that may adopt the present invention.

FIG. 2 is a plan view showing the overall structure of the work vehicle. Reference numeral 8 in FIG. 2 indicates an engine that functions as a prime mover, installed below the cabin 5 above the chassis 1. The engine 8 may be, for instance, a large diesel engine. The engine 8 generates three-phase AC power (at, for instance, 1500 kW) by driving a main generator 9. The engine 8 also drives a sub-generator 10 that generates a DC voltage of, for instance, 24V. Reference numeral 11 indicates a battery charged by the sub-generator 10. In addition, the engine 8 has a function of circulating pressure oil through the hoisting cylinder 7 that tilts the body 4 up/down, a steering cylinder (not shown) and the like by rotationally driving a hydraulic pump (not shown) used as a hydraulic source. As shown in FIG. 1, a hydraulic operating fluid tank 12 into which the hydraulic operating fluid output from the hydraulic pump is collected is mounted at the side of the chassis 1.

Reference numeral 14 in FIG. 2 indicates a power control device which, together with a vehicle controller 15, executes power control for the dump truck. The vehicle controller 15 operates on the power sourced from the battery 11. As shown in FIG. 1, the power control device 14, located at the side of the cabin 5, is constituted with a distribution control panel disposed in an upright orientation above the chassis 1 and the like. The power control device 14 drives traveling motors 16, which are AC electric motors, a drive motor 18 (see FIG. 3) for lubricating oil pumps 17 and the like with the power generated at the main generator 9 in conformance to a control signal output from the vehicle controller 15 shown in FIG. 2. It is to be noted that the rotation rates of the traveling motors 16 are independently regulated under feedback control.

Reference numeral 20 indicates a traveling drive device that includes the traveling motors 16 installed at the rear of the dump truck. The traveling drive device 20 comprises the traveling motors 16 disposed on the left side and the right side, a motor housing sleeve 22 housing the left/right traveling motors 16, rotating shafts 24 rotationally driven by the traveling motors 16, reduction gear units 27 (see FIG. 3) and the like.

Figure 3:
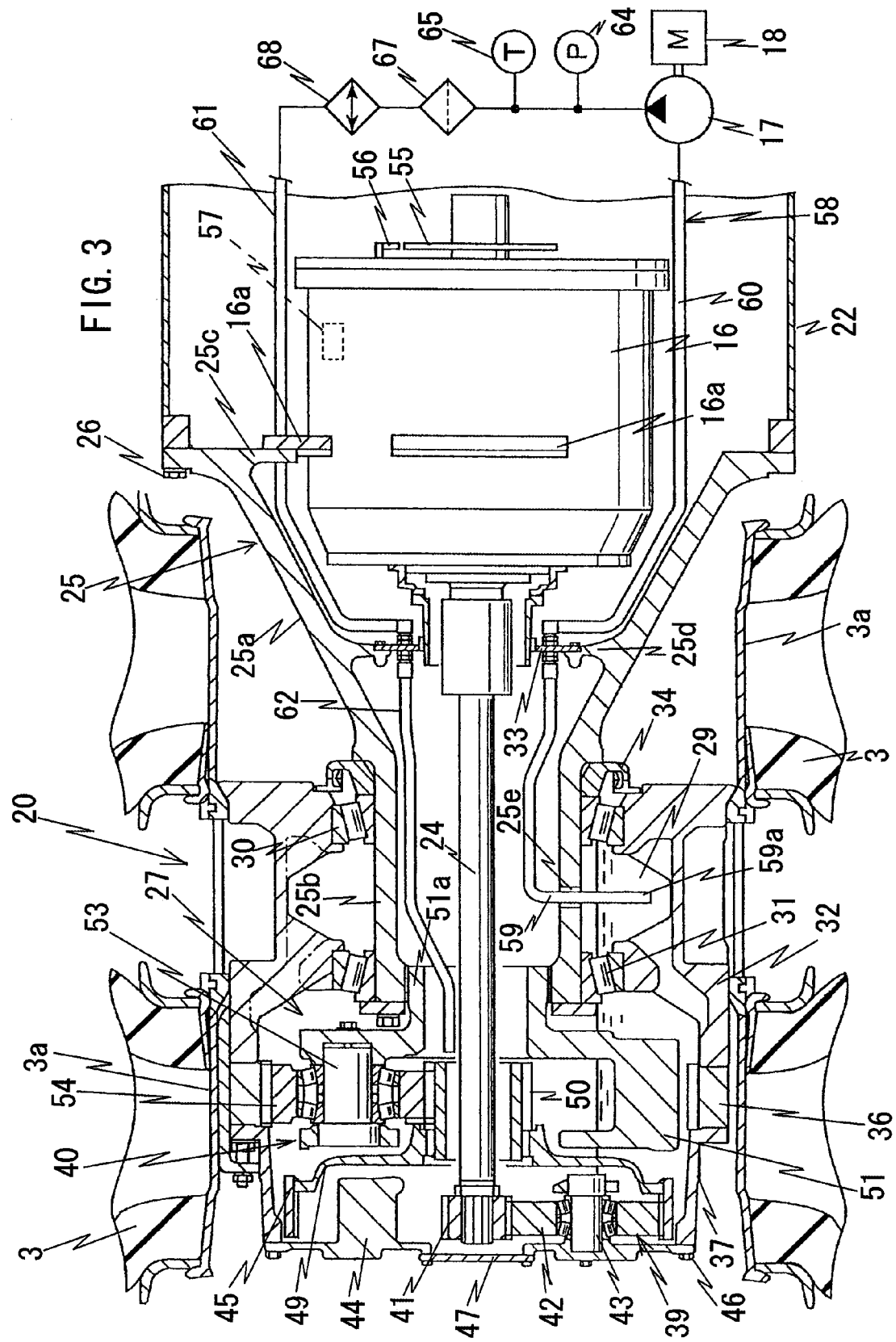
FIG. 3 shows the structure of a traveling drive device that includes the lubricating oil cooling device achieved in an embodiment of the present invention.

FIG. 3 shows the piping connection at the lubricating oil cooling device as well as the structures of the traveling motors 16, the reduction gear units 27 and the like. FIG. 3 shows a tubular spindle 25 detachably mounted via a bolt 26, to an outer end of the motor housing sleeve 22 along the axial direction. The tubular spindle 25 includes a tapered portion 25a assuming a smaller diameter on the outer side along the axial direction and a small diameter portion 25b extending further out from the tapered portion 25a. A wheel mounting sleeve 32 is rotatably fitted on the outside of the small diameter portion 25b via bearings 30 and 31. Rims 3a of the two wheels 3 on either side are locked onto the outside of the wheel mounting sleeve 32.

At the inner end of the tapered portion 25a of the tubular spindle 25, a plurality of mounting seats 25c projecting inward along the radial direction are formed as integrated parts thereof. By placing a mounting flange 16a at the outer circumference of the corresponding traveling motor 16 in alignment with the mounting seats 25c and fastening them together with bolts (not shown), the traveling motor 16 is attached onto the tubular spindle 25. In addition, a ring-shaped mounting portion 25d projecting inward along the radial direction is formed on the inner circumferential side of the tapered portion 25a at the tubular spindle 25 and a partitioning wall 33 separating the traveling motor 16 from the reduction gear units housing is installed between the mounting portion 25*d* and the traveling motor 16. Reference numeral 34 indicates a seal member disposed between the outer circumference of the tubular spindle 25 and the wheel mounting sleeve 32. The seal member 34 prevents leakage of lubricating oil 29 collected inside the wheel mounting sleeve 32 and also prevents any dust or the like originating from the outside from entering the wheel mounting sleeve 32.

The reduction gear unit 27 disposed between each rotating shaft 24 and the wheel mounting sleeve 32 is now described. An internal gear 36 and an outer drum 37 are locked via long bolts (not shown) onto the outer end of the wheel mounting sleeve 32. The reduction gear unit 27 includes a first reduction gear mechanism 39 and a second reduction gear mechanism 40. The first reduction gear mechanism 39 is constituted with a sun gear 41 connected to the front end of the rotating shaft 24 via a spline, a plurality of (e.g., 3) planetary gears 42 (only one planetary gear is shown) that rotate due to the rotation of the sun gear 41, a carrier 44 rotatably supporting each planetary gear 42 via a support pin 43 and an internal gear 45 interlocking with the planetary gears 42. The carrier 44 is detachably fixed onto the outer end of the outer drum 37 via bolts 46. An inspection window is formed at the center of the carrier 44 with a lid 47 detachably mounted via a bolt at the window opening.

The second reduction gear mechanism 40 includes a sun gear 50, a carrier 51, an internal gear 36 and a planetary gear 54. The sun gear 50 is disposed concentrically with the rotating shaft 24 via a coupling 49 provided as an integrated part of the internal gear 45 at the first reduction gear mechanism 39. The carrier 51 includes a tubular portion 51*a* which is detachably fitted inside the outer end of the small diameter portion 25*b* of the tubular spindle 25 via a spline or the like by ensuring that rotation of the tubular portion 51*a* is disallowed. The internal gear 36 is fixed to the wheel mounting sleeve 32. The planetary gear 54 rotatably attached to one of, for instance, three support pins 53 locked onto the carrier 51, interlock with the sun gear 50 and the internal gear 56.

The reduction gear unit 27, constituted with the first reduction gear mechanism 39 and the second reduction gear mechanism 40 described above, causes the wheels 3 to rotate with great torque at a rotation speed lowered to approximately $1/30 \sim 1/40$, for instance, of the rotation speed of the rotating shaft 24 rotated by the traveling motor 16.

Reference numeral 55 indicates a disk attached to the rotating shaft 24 of the traveling motor 16 and reference numeral 56 indicates a speed sensor disposed so as to face opposite the outer circumference of the disk. The speed sensor 56 detects the rotation speed of the rotating shaft 24 of the traveling motor 16. A temperature sensor (hereafter referred to as a first temperature sensor) 57 that detects the temperature of the traveling motor 16 is installed at the stator of the traveling motor 16.

Figure 4:
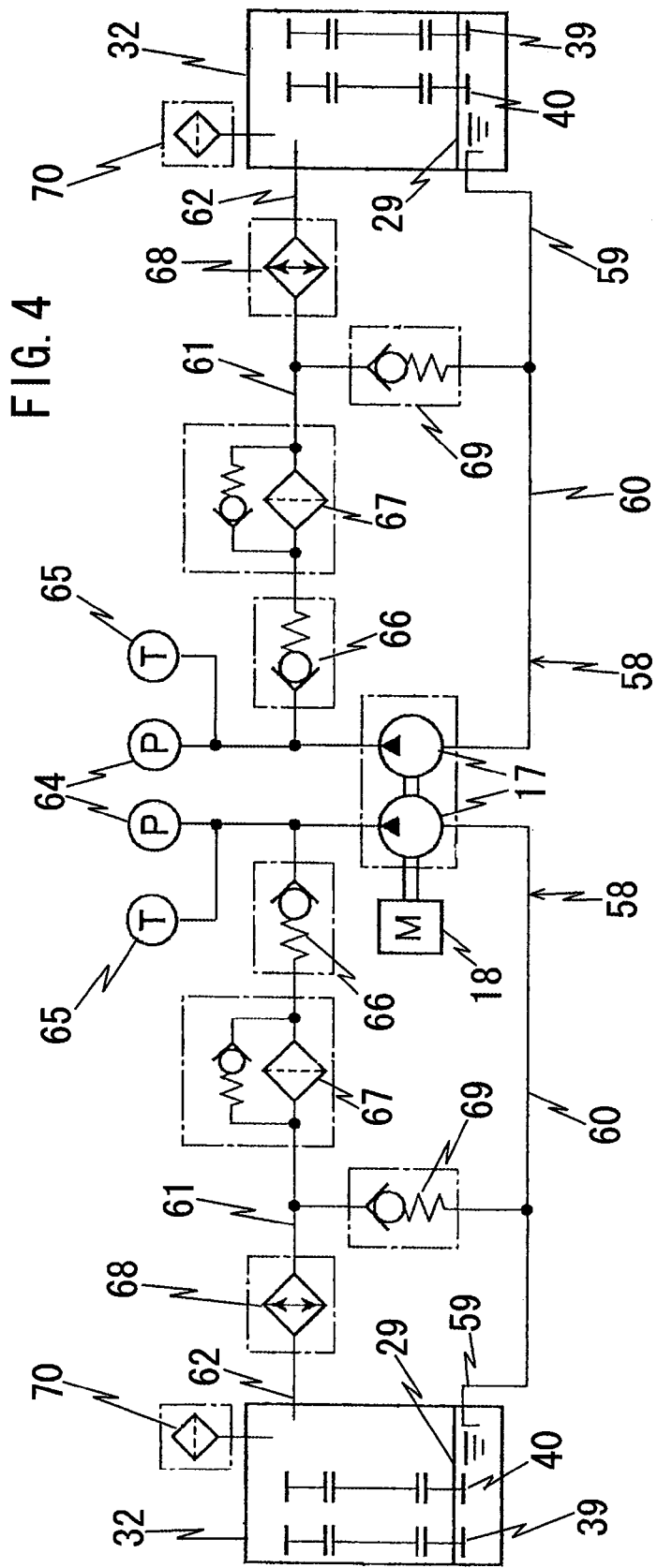
FIG. 4 is a system diagram of the lubricating oil cooling device achieved in the embodiment.

Next, the lubricating oil cooling device that cools the lubricating oil supplied to the reduction gear units 27 is described. FIG. 4 is a system diagram of the lubricating oil cooling device. Two lubricating oil pumps 17 are disposed, one in correspondence to the left wheels 3 and the other in correspondence to the right wheels 3 and two lubricating oil circulation paths 58 and 58 are formed, one in correspondence to the left wheels 3 and the other in correspondence to the right wheels 3. The two lubricating oil pumps 17 and 17 are driven via a single drive motor 18. It is to be noted that the two lubricating oil pumps 17 may each be driven by a dedicated drive motor 18, instead.

As shown in FIGS. 3 and 4, the circulation paths 58 are each made up with an intake piping 59 disposed further outward along the axial direction relative to the partitioning wall 33 inside the tubular spindle 25, an intake piping 60 connected to the intake piping 59 over an area where the partitioning wall 33 is present, with an inner end thereof connected to an intake port of the lubricating oil pump 17, a delivery piping 61 ranging from an outlet port of the lubricating oil pump 17 to the partitioning wall 33 and a delivery piping 62 connected to the delivery piping 61 over an area where the partitioning wall 33 is present and disposed further outward along the axial direction relative to the partitioning wall 33 inside the tubular spindle 25.

Figure 5:
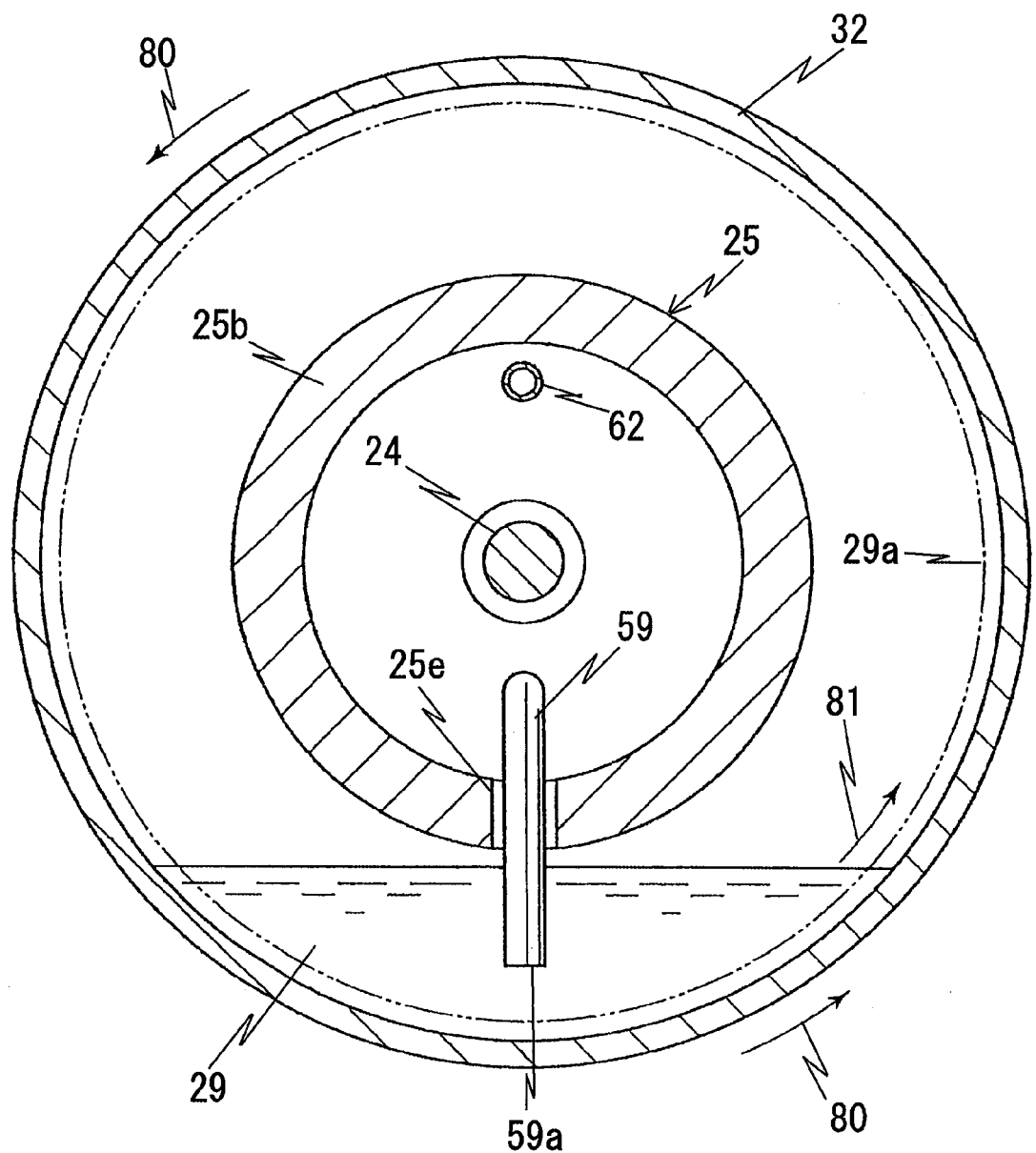
FIG. 5 is a sectional view showing the positional relationship between the lubricating oil and the intake piping as observed in the embodiment.

As shown in FIGS. 3 and 5, the intake piping 59 is inserted through a hole 25*e* formed at the bottom of the small diameter portion 25*b* of the tubular spindle 25, and its intake port 59*a* at the lower end is immersed in the lubricating oil 29 collected at the bottom of the wheel mounting sleeve 32. The delivery piping 62 disposed further outward along the axial direction relative to the partitioning wall 33 travels through the tubular spindle 25 and its front end faces opposite the carrier 51, as shown in FIG. 3.

The air intake that may occur at the wheel mounting sleeve 32 as the corresponding lubricating oil pump 17 is engaged in operation is described in reference to FIG. 5. As the vehicle travels with each wheel mounting sleeve 32 rotating along the direction indicated by the arrow 80 in FIG. 5, the increase in the centrifugal force attributable to the rising rotation speed causes the lubricating oil 29 to move upward along the inner wall of the wheel mounting sleeve 32, as indicated by the arrow 81. This may cause the surface level of the lubricating oil 29 to become lower than the intake port 59*a* of the intake piping 59 and in such a case, air will be taken in through the intake port 59*a* as the lubricating oil pump 17 is engaged in operation. The lubricating oil surface level becomes lower at the bottom of the wheel mounting sleeve 32 and air intake occurs as a result more readily when the lubricating oil temperature is low (i.e., the viscosity is high) and also when the speed of the traveling motor 16 (i.e., the vehicle speed) is higher.

Figure 6:
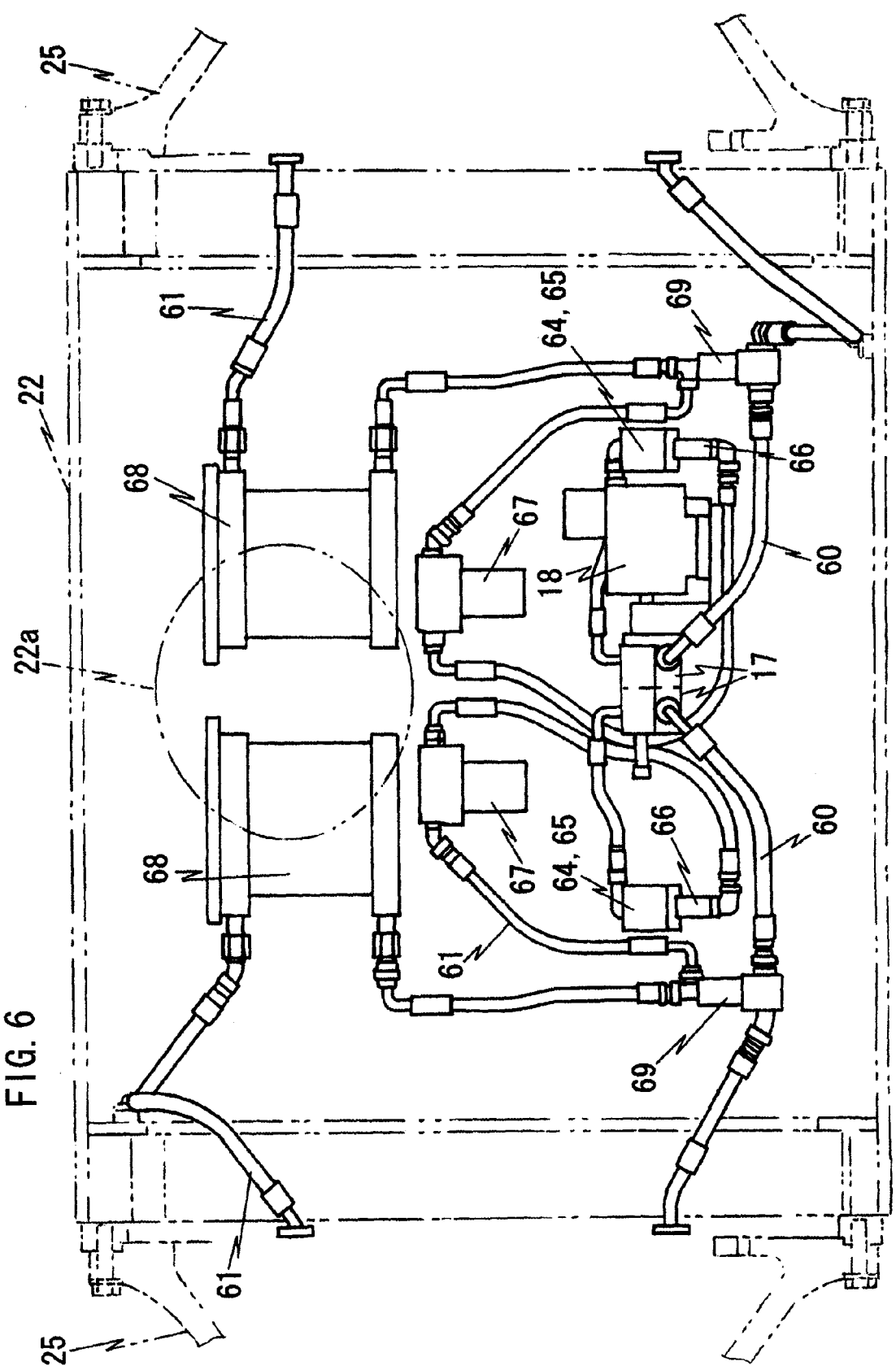
FIG. 6 is a see-through view of the components constituting the lubricating oil cooling device in the embodiment, taken from the cabin side.

FIG. 6 is a see-through view of the components disposed inside the motor housing sleeve 22, taken from the side (front side) where the cabin 5 is present. FIG. 6 does not include an illustration of the traveling motors 16. As shown in FIGS. 4 and 6, a pressure sensor 64 that detects the pressure (output pressure) of the lubricating oil having been output, a temperature sensor (hereafter referred to as a second temperature sensor) 65 that detects the lubricating oil temperature, a pressure holding valve 66, a dust filter 67 and an oil cooler 68 are disposed at the delivery piping 61 of each lubricating oil pump 17. It is to be noted that the lubricating oil pumps 17 each include two input ports and two output ports. In addition, the pressure sensor 64 and the second temperature sensor 65 are housed inside a single case. The pressure holding valve 66 opens at a cracking pressure of, for instance, approximately 0.15 MPa so as to distribute the lubricating oil output from the lubricating oil pump 17 towards the downstream side where the filter 67 is installed.

The oil cooler 68 cools the lubricating oil with cooling air from the motor cooling system, driven by a fan (not shown) mounted on the chassis 1 at a position further forward relative to the motor housing sleeve 22, and supplied thereto via an air supply hole 22*a* formed at the front surface of the motor housing sleeve 22.

Reference numeral 69 indicates a bypass valve disposed between the upstream side relative to the oil cooler 68 at the delivery piping 61 and the intake piping 60 for purposes of protecting the oil cooler 68. The bypass valve 69, which is constituted with a check valve, opens if the lubricating oil pressure inside the delivery piping 61 rises to an excessively high pressure level (P2) so as to cause the lubricating oil in the delivery piping 61 to flow back toward the intake piping 60. The cracking pressure for the bypass valve 69 is set to, for instance, approximately 0.4~0.6 MPa, lower than the 1 MPa level at which damage to the oil cooler 68 may occur. It is to be noted that reference numeral 70 in FIG. 4 indicates an air breather, which is installed above each wheel mounting sleeve 32 and has a function of preventing fluctuation of the air pressure inside the wheel mounting sleeve 32 due to the internal temperature affecting the air pressure inside the wheel mounting sleeve 32 and thus sustaining the internal pressure substantially at one atmosphere.

Figure 7:
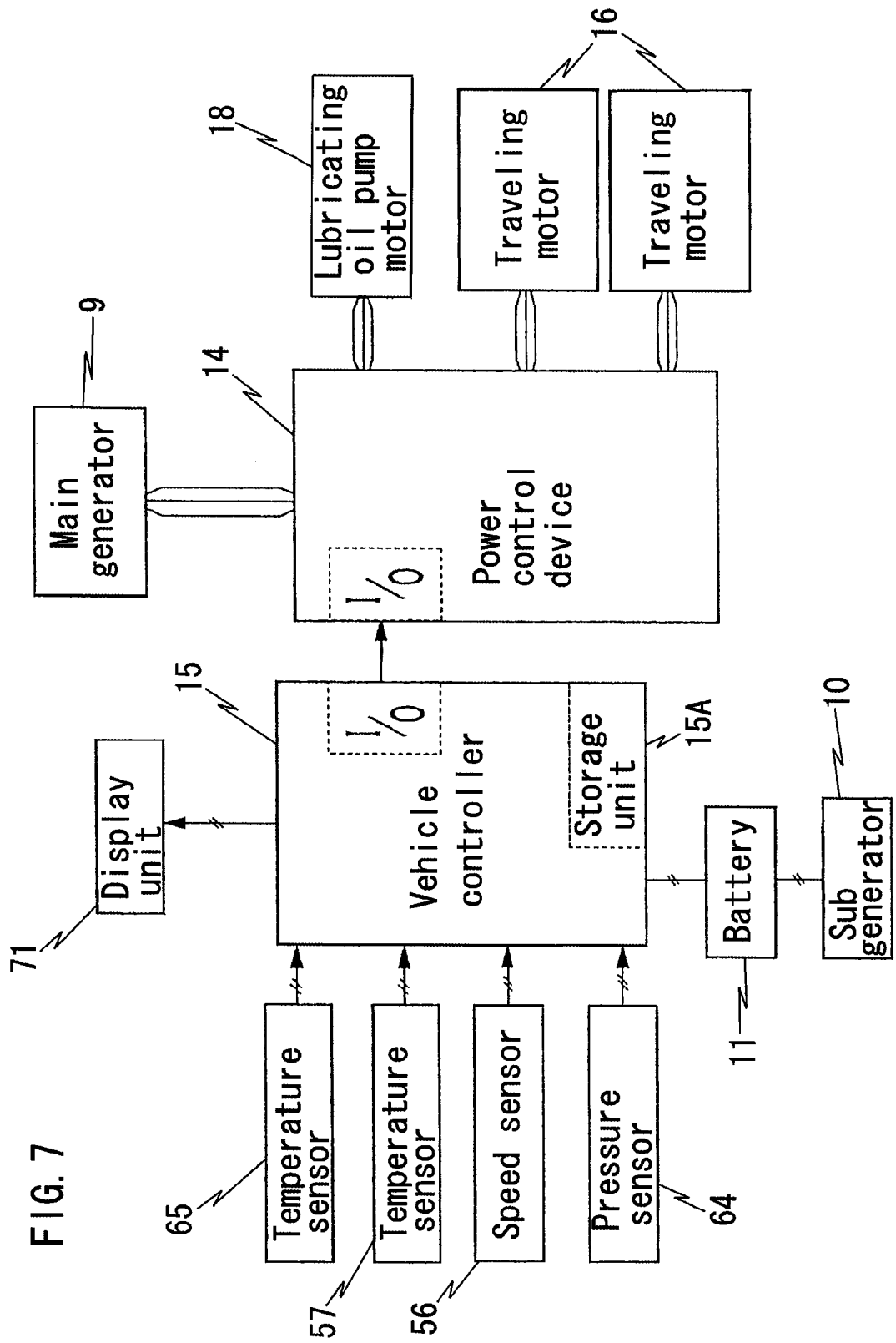
FIG. 7 is a control block diagram of the traveling drive device achieved in the embodiment.

FIG. 7 is a control block diagram pertaining to the traveling motors 16 and the lubricating oil pump drive motor 18. As illustrated in the figure, detection signals originating from the speed sensor 56, the pressure sensor 64, the first temperature sensor 57 and the second temperature sensor 65 corresponding to each traveling motor 16 are input to the vehicle controller 15, which operates on power sourced from the battery 11. A display unit 71 installed in the cabin 5 is connected to the output side of the vehicle controller 15. The power control device 14 is also connected to the output side of the vehicle controller 15. The operator is able to view alarm information indicating a sensor error or the like brought up on display at the display unit 71. The vehicle controller 15 includes a storage unit 15A constituted with a ROM, a RAM (which may be a nonvolatile memory) and the like, and reference values and the like, to be compared with the temperatures and the pressures detected by the first and second temperature sensors 57 and 65 and the pressure sensors 64 are stored in the storage unit 15A. In addition, a lubricating oil supply control program, based upon which the drive motor 18 for the lubricating oil pumps 17 is driven and turned off and the like, is stored in the storage unit.

Figure 8:
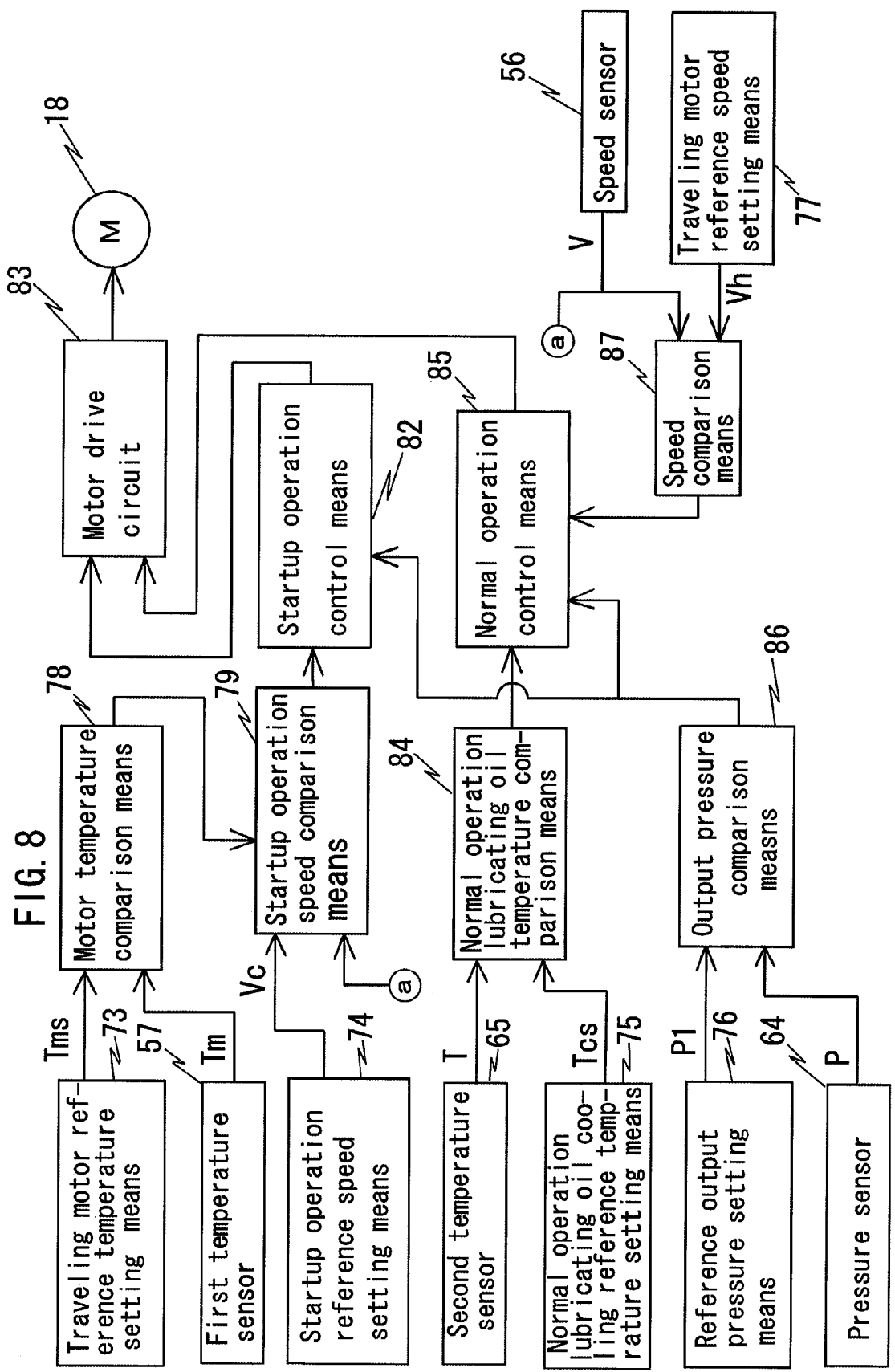
FIG. 8 is a function block diagram of the lubricating oil cooling device achieved in the embodiment.

FIG. 8 is a control function block diagram of the control executed on the drive motor 18 for the lubricating oil pumps 17, based upon a program installed in the vehicle controller 15 shown in FIG. 7. A traveling motor reference temperature setting means 73 in FIG. 8 sets a reference temperature Tms (e.g., 50° C.) used as a criterion for making a decision as to whether or not a traveling motor 16 has reached a temperature at which the lubricating oil can circulate following a startup of the lubricating oil pumps 17 during the startup operation based upon a rule of thumb whereby a certain degree of correlation exists between the temperature of the traveling motors 16 and the temperature of the lubricating oil inside the wheel mounting sleeves 32. A motor temperature comparison means 78 compares the temperature Tm of the traveling motors 16 detected via the first temperature sensors 57 with the reference temperature Tms set by the traveling motor reference temperature setting means 73.

A startup operation reference speed setting means 74 sets a reference speed Vc at which it is reasonable to expect air intake to occur during the startup operation. A startup operation speed comparison means 79 compares the speed V of the traveling motors 16 detected by the speed sensors 56 with the startup operation reference speed Vc.

On the condition that Tm has become equal to or greater than Tms, i.e., on the condition that the temperature Tm of the traveling motors 16 has become equal to or greater than the reference temperature Tms, a startup operation control means 82 engages the drive motor 18 for the lubricating oil pumps 17 via the motor drive circuit 83 if the detected speed V of the traveling motors 16 is lower than the startup operation reference speed Vc but stops the drive motor 18 if the detected speed V is higher than the reference speed Vc.

A normal operation cooling reference temperature setting means 75 sets a reference temperature Tcs (e.g., 55° C.) used as a criterion for deciding whether or not the lubricating oil temperature T is at a level that requires cooling. A normal operation lubricating oil temperature comparison means 84 compares the lubricating oil temperature (the temperature of the oil output from the lubricating oil pumps 17) T at the circulation paths 58 detected by the second temperature sensors 65 with the reference temperature Tcs used as the criterion for the normal operation.

A normal operation control means 85 engages the drive motor 18 for the lubricating oil pumps 17 via the motor control circuit 83 when the lubricating oil temperature comparison results provided by the normal operation lubricating oil temperature comparison means 84 indicate that T≧Tcs and stops the drive motor 18 when T<Tcs.

A reference output pressure setting means 76 sets a reference output pressure P1 (e.g., 0.1 MPa) used as a criterion for making a decision as to whether or not air is being taken in at the lubricating oil pumps 17. An output pressure comparison means 86 compares the output pressure P at the lubricating oil pumps 17 detected by the pressure sensors 64 with the reference output pressure P1 and stops the drive motor 18 via the startup operation control means 82 or the normal operation control means 85 if P<P1 so as to prevent cavitation attributable to the air intake.

A normal operation reference speed setting means 77 sets a speed Vh for the traveling motors 16, at which it is reasonable to expect air intake through the intake ports 59a during normal operation. A normal operation speed comparison means 87 compares the detected speed V with the reference speed Vh and once V becomes equal to or greater than Vh, it stops the drive motor 18 via the normal operation control means 85. It is to be noted that instead of providing the normal operation reference speed setting means 77 and the startup operation reference speed setting means 74 as means independent of each other, the reference speed Vc may be calculated automatically through arithmetic operation or the like based upon the reference speed Vh set by the normal operation reference speed setting means 77.

Figure 9:
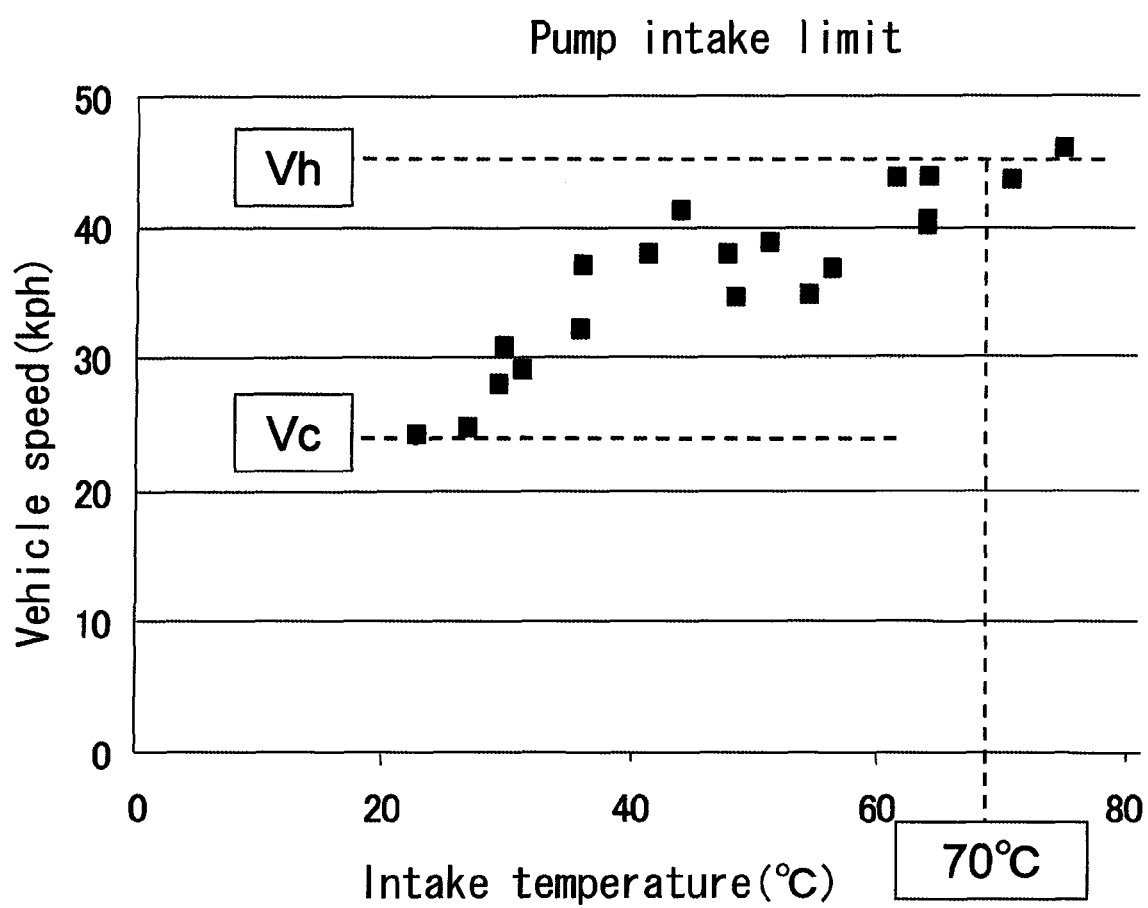
FIG. 9 presents a graph indicating the relationship between the lubricating oil temperature and the speed limit at which air intake may occur, as observed in a large work vehicle.

FIG. 9 presents a graph showing an example of fluid intake characteristics that may be observed that the lubricating oil pumps 17. The graph shows the work vehicle speed at which air intake occurs, observed by altering the oil temperature (intake temperature) of the lubricating oil (#90), detected by the second temperature sensors 65, and the vehicle speed. Assuming that the lubricating oil temperature during normal operation is 70° C., the speed defining the intake limit, i.e., the reference speed Vh at which the likelihood of air intake arises, is approximately 46 kph as indicated in FIG. 9. At the time of a startup operation during which Tm<Tms (=55° C.), the vehicle speed at which air intake occurs becomes lower but once the temperature nears 20° C., the vehicle speed at which air intake occurs becomes less consistent. However, it has been learned that in many cases, unnecessary cavitation can be averted by stopping the lubricating oil pumps 17 when the vehicle speed exceeds Vc=α×Vh (α=0.4~0.6). It is to be noted that while the material constituting the lubricating oil is a determining factor, the lubricating oil temperature during normal operation in correspondence to which Vh is set should be set to 60~80° C. It is also to be noted that under normal circumstances, once the lubricating oil reaches 50° C.~70° C., it requires cooling.

Next, the operation of the vehicle controller 15 in FIG. 8 is described. As indicated in the flowchart presented in FIG. 10, following the start of the traveling operation of the work vehicle, the temperature Tm of the traveling motors 16 detected by the first temperature sensors 57 is read into the vehicle controller 15 (step 1). The motor temperature comparison means 78 compares the temperature Tm of the traveling motors 16 with the reference temperature Tms (e.g., 50° C.) set by the traveling motor reference temperature setting means 73 (step 2) and the operation returns to step 1 if Tm is less than Tms. Once Tm becomes equal to or greater than Tms, it is judged that the temperature of the lubricating oil inside the wheel mounting sleeves 32 may have risen to a level requiring cooling and accordingly, the operation enters the lubricating oil pump startup routine (step 3).

Figure 11:
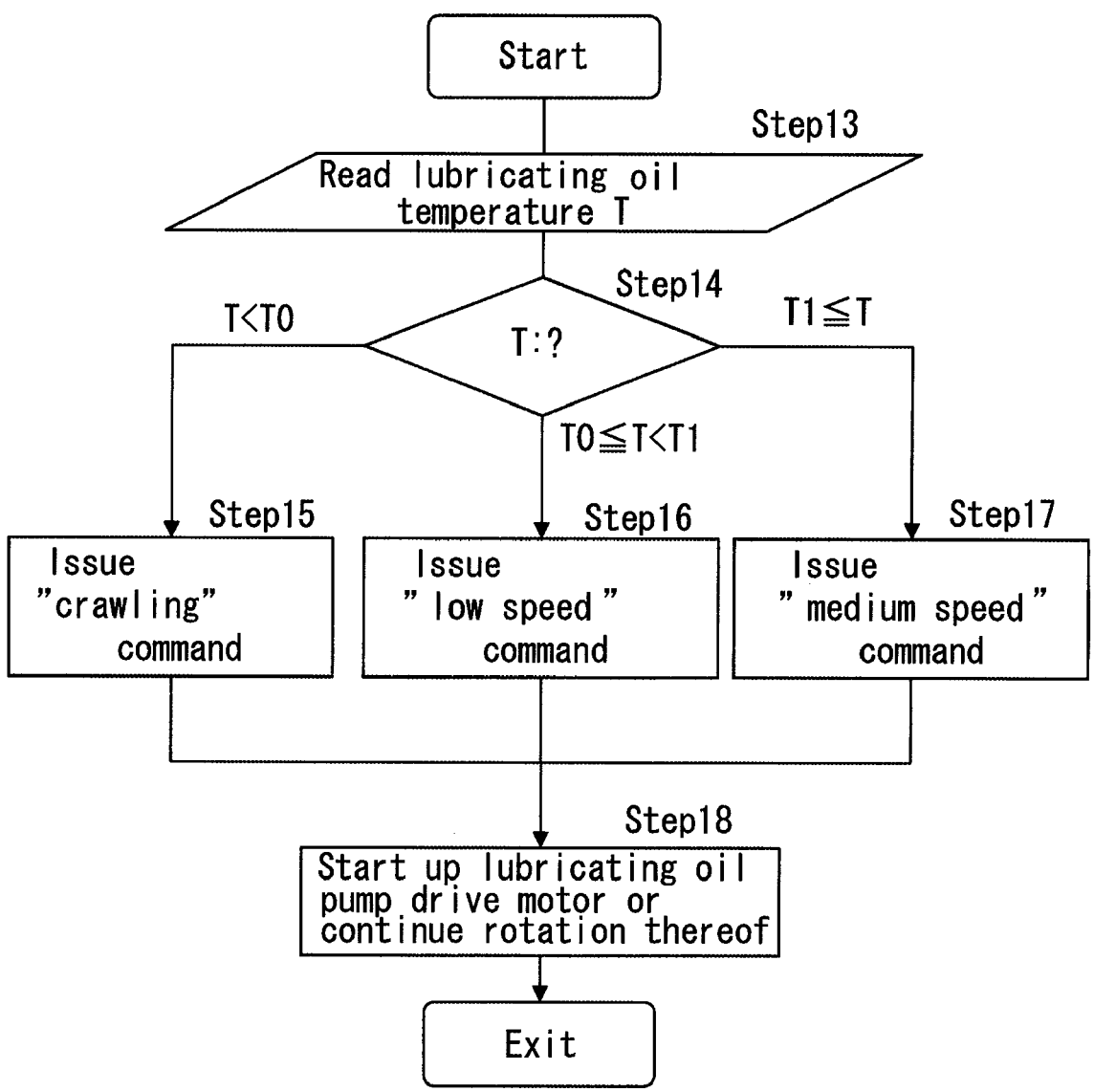
FIG. 11 presents a detailed flowchart of the startup operation executed in the embodiment.

In the lubricating oil pump startup routine shown in FIG. 11, the lubricating oil temperature T in the circulation paths 58 detected by the second temperature sensors 65 is read into the vehicle controller 15 (step 13). Next, the lubricating oil temperature T is compared with a reference temperature T0 (e.g., 5° C.) and a reference temperature T1 (e.g., 35° C.) (step 14). If T is determined to be less than T0, the startup operation control means 82 issues a crawling command to the motor drive circuit 83 so as to drive the drive motor 18 at, for instance, 4 Hz (the preferred range is 3~6 Hz) (steps 15 and 18). If, on the other hand, T0≦T<T1, the startup operation control means 82 issues a low speed command to the motor drive circuit 83 so as to drive the drive motor 18 at, for instance, 15 Hz (the preferred range is 10~20 Hz) (steps 16 and 18). If T is equal to or greater than T11, the startup operation control means issues a medium speed command to the motor drive circuit 83 so as to drive the drive motor 18 at, for instance, 50 Hz (the preferred range is 40~60 Hz) (steps 17 and 18).

Figure 12:
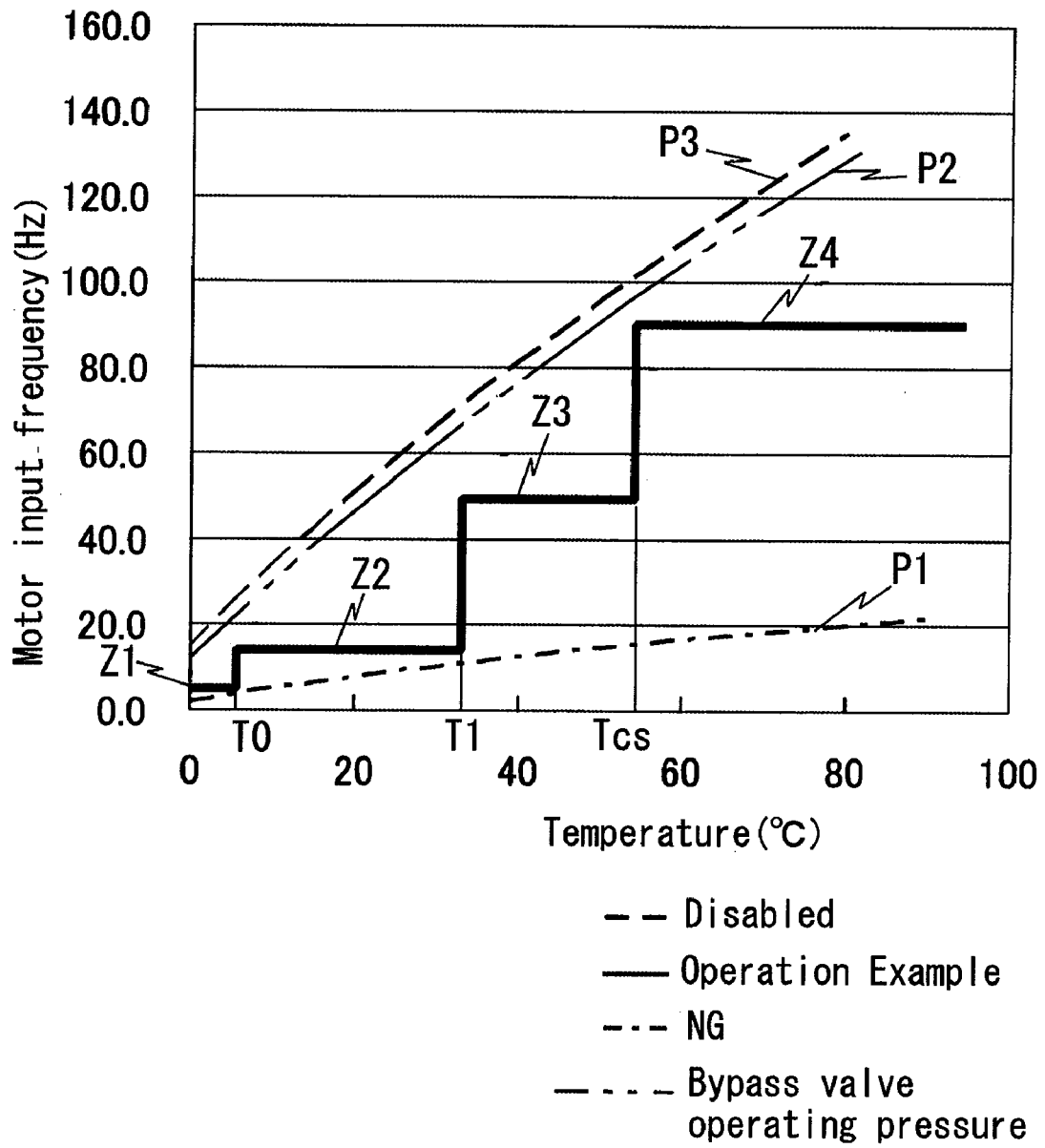
FIG. 12 presents an example of motor operation control that may be executed in the embodiment.

FIG. 12 presents an example of motor operation control under which the input frequency at the drive motor 18 is adjusted in correspondence to the lubricating oil temperature T. In this example, Z1 is set to 4 Hz, Z2 is set to 15 Hz and Z3 is set to 50 Hz. In addition, P1 in FIG. 12 represents the output pressure at the lubricating oil pumps 17 at which air intake is assumed to occur. P2 represents the output pressure corresponding to the cracking pressure (e.g., 0.47 MPa) at which the bypass valves 69 are assumed to crack. P3 represents the output pressure at which damage to the oil coolers 69 may occur (e.g., 1.0 MPa.

Figure 10:
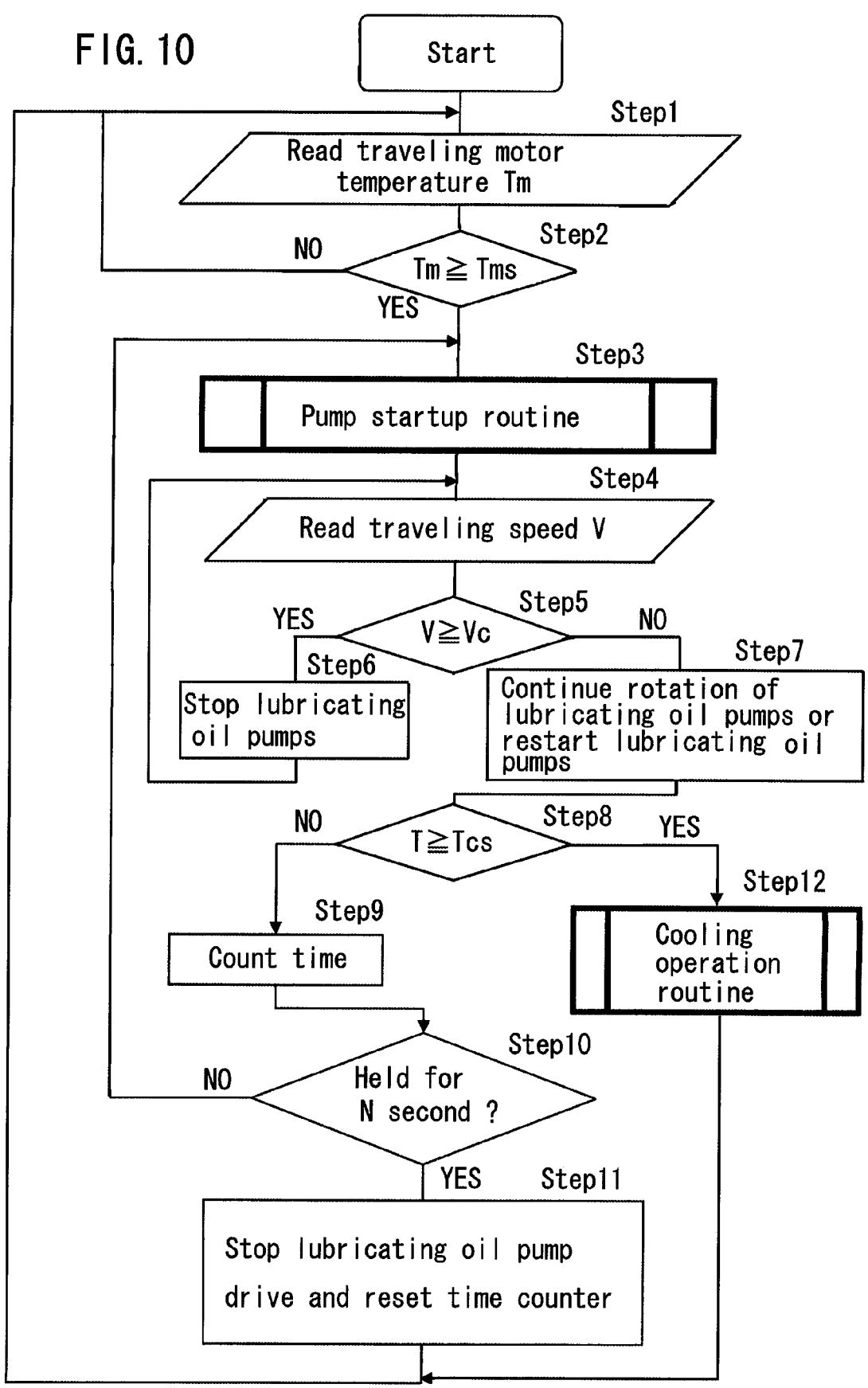
FIG. 10 presents a flowchart of the startup operation executed in the embodiment.

After engaging the drive motor 18 (lubricating oil pumps 17) in operation at the speed corresponding to the lubricating oil temperature detected by the second temperature sensors 65 through the processing executed in steps 13~18, the operation returns to the processing in FIG. 10. The speed V of the traveling motors 16 detected by the speed sensors 56 is read into the vehicle controller 15 (step 4). The startup operation speed comparison means 79 compares the speed V detected by the speed sensors 56 with the reference speed Vc set by the startup operation reference speed setting means 74 (step 5). If V is equal to or greater than Vc, it is judged that air may be taken in and accordingly, the operation shifts into step 6 to stop the drive motor 18 and the lubricating oil pumps 17, before the operation returns to step 4. If, on the other hand, V is less than Vc, it is judged that there is no risk of air intake and accordingly, the operation of the lubricating oil pumps 17 is continued or the lubricating oil pumps 17 are started up again (step 7).

In the following step 8, a decision is made as to whether or not the lubricating oil temperature T detected by the second temperature sensors 65 has reached Tcs (e.g., 55° C.) at which normal operation should commence. If T is determined to be less than Tcs, a time counter included in the vehicle controller 15 is started up or the time count on the time counter is continued (step 9). The time counter counts the cumulative length of time over which the lubricating oil pumps 17 have been engaged in operation following the lubricating oil pump startup. Next, in step 10, a decision is made as to whether or not the lubricating oil pumps 17 have been engaged in operation for N seconds (e.g., 300~600 seconds) representing the length of time deemed to elapse before the lubricating oil, the temperature of which is detected by the second temperature sensors 65, is completely made up with the lubricating oil originating from the inside of the wheel mounting sleeves 32. If it is decided that the lubricating oil pumps have been engaged in operation for N seconds, the drive motor 18 and consequently the lubricating oil pumps 17 are turned off and also the time counter is reset (step 11). If the length of time over which the lubricating oil pumps 17 have been engaged in operation during the startup phase has not reached N seconds, the operation returns to the startup routine in step 3.

Figure 13:
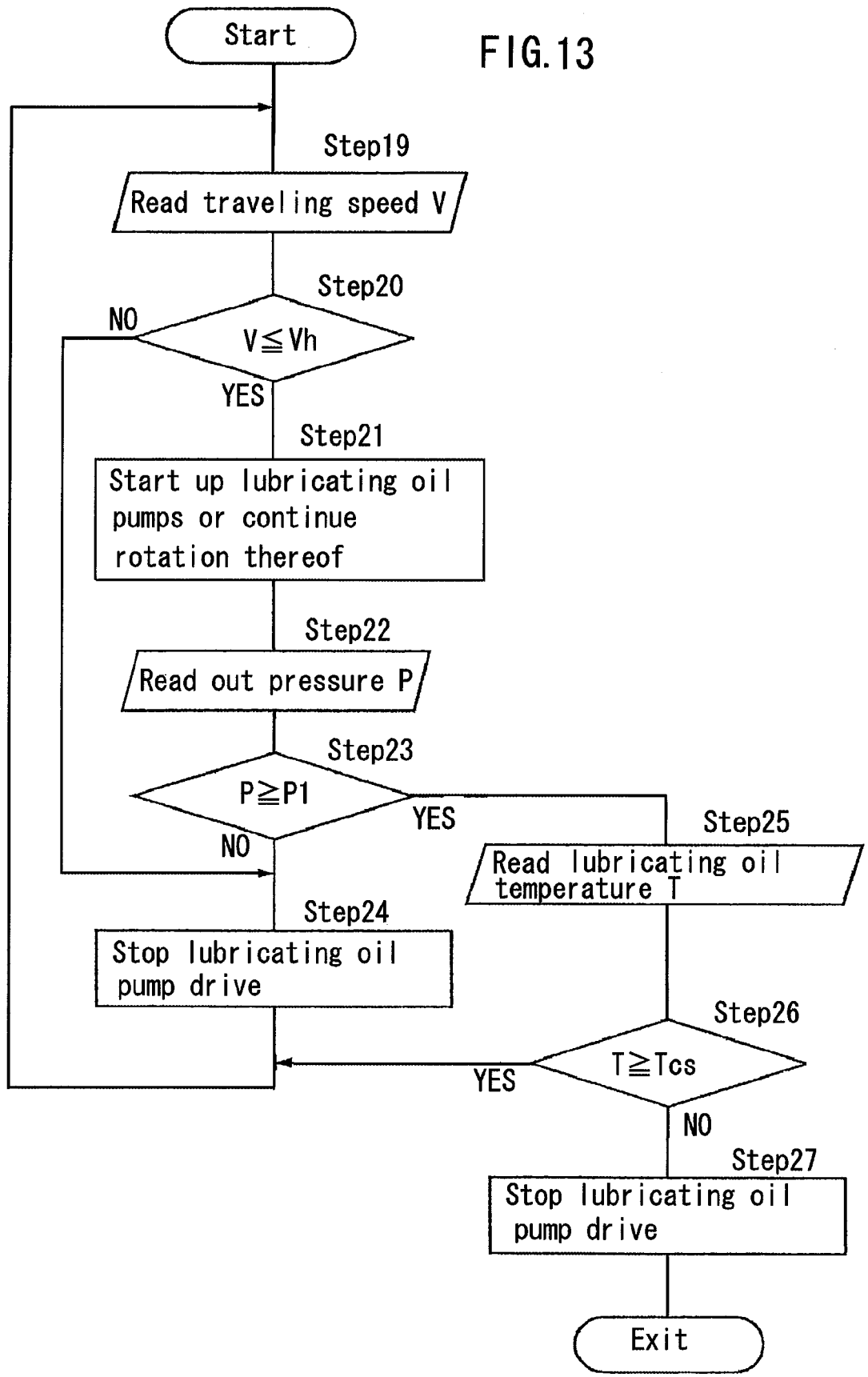
FIG. 13 presents a flowchart of the normal operation executed in the embodiment.

If it is decided in step 8 that T≧Tcs, the lubricating oil temperature is judged to have risen to a sufficiently high level at which the viscosity of the lubricating oil is low enough to allow the lubricating oil pumps 17 (drive motor 18) to operate at the rated rotation rate with a sufficient safety margin, and accordingly, the operation proceeds to the normal operation routine in step 12 (see FIG. 13). The rated frequency Z4 for normal operation may be, for instance, 90 Hz, as in the example presented in FIG. 12.

During normal operation, the speed V of the traveling motors 16 detected by the speed sensors 56 is read (step 19) and the speed comparison means 87 compares the speed V with the reference speed Vh set by the reference speed setting means 77 (step 20), as shown in the flowchart in FIG. 13. If V≦Vh, the lubricating oil pumps 17 are judged to be operating without running the risk of air intake and accordingly, the normal operation control means 85 drives or continues to rotate the drive motor 18 with the rated rotation rate (e.g., 90 Hz) via the motor drive circuit 83, thereby cooling the lubricating oil by circulating it through the wheel mounting sleeves 32 and the circulation paths 58 (step 21).

If V>Vh, it is deemed that the surface level of the lubricating oil 29 may drop to or below the intake port 59a with centrifugal force causing the lubricating oil 29 inside the wheel mounting sleeves 32 to move upward along the inner walls of the wheel mounting sleeves 32, as has be shown in reference to FIG. 5. Accordingly, the lubricating oil pumps 17 (drive motor 18) are stopped (step 24), and then the operation returns to step 19.

After starting up the drive motor 18 or sustaining the drive motor 18 in the rotating state in step 21, the output pressure P detected by the pressure sensors 64 is read (step 22) and the output pressure thus read is compared with the reference output pressure P1 (step 23). If P<P1, it is judged that air is being taken in and accordingly, the drive motor 18 is turned off (step 24). If P≧P1, the lubricating oil temperature T detected by the second temperature sensors 65 is read (step 25) and the lubricating oil temperature T is compared with the reference temperature Tcs (step 26). If T<Tcs, the lubricating oil is judged to have been cooled and accordingly, the drive motor 18 is turned off (step 27), before the operation returns to step 1 in FIG. 9. If T≧Tcs, however, the operation returns to step 19.

It is to be noted that in the embodiment described above, a set of sensors made up with a first temperature sensor 57, a second temperature sensor 65, a speed sensor 56 and a pressure sensor 64 is installed in correspondence to each of the left/right traveling motors 16 and 16 and also in correspondence to each of the lubricating oil pumps 17 and 17. However, a single drive motor 18 is installed to serve both lubricating oil pumps 17 and 17. The outputs from the two sets of sensors installed in correspondence to the left traveling motor and the right traveling motor may be processed so that the drive motor 18 is turned on or off or the speed is switched as the output from a sensor corresponding to either the left side traveling motor or the right side traveling motor or the outputs from the sensors corresponding to the left side traveling motor and the right side traveling motor reach the threshold value (reference temperature, reference speed, reference pressure) or fall below the threshold value. As an alternative to such sensor output processing, the drive motor 18 may be turned on or off or the speed thereof may be switched when the average value of the outputs from the sensors corresponding to the left side traveling motor and the right side traveling motor reaches the threshold value or falls below the threshold value. Furthermore, instead of processing the outputs from the various types of sensors in a uniform processing mode, the processing mode may be adjusted in correspondence to the sensor type. In addition, when the present invention is adopted in a structure that includes drive motors 18 each installed in correspondence to either the left-side lubricating oil pump 17 and the right-side lubricating oil pump 17, the outputs from the left side sensors and the outputs from the right side sensors should be utilized in the control of the corresponding drive motors 18.

In the embodiment described above, as the temperature Tm of the traveling motors 16 rises to a level equal to or greater than the reference temperature Tms during the startup operation, the temperature of the lubricating oil 29 inside the wheel mounting sleeves 32 is judged to have risen to a level at which it can be taken in through the lubricating oil pumps 17 and, accordingly, the lubricating oil pumps 17 are engaged in operation at low speed so as to circulate the lubricating oil 29 in the wheel mounting sleeve via the lubricating oil pumps 17. In addition, since the startup operation reference speed Vc for stopping the lubricating oil pumps is set lower than the normal operation reference speed Vh by assuming that the lubricating oil temperature is low during the startup operation, the lubricating oil pumps are allowed to operate without experiencing cavitation in the optimal state best suited to the startup operation conditions under which the lubricating oil temperature remains low.

Namely, while the temperature of the lubricating oil inside the wheel mounting sleeves 32 is low, the viscosity of the lubricating oil is high compared to the lubricating oil viscosity during normal operation and thus, the lubricating oil traveling up along the inner walls of the wheel mounting sleeves as the work vehicle travels does not flow down toward the bottom readily. Accordingly, the traveling motor startup operation reference speed Vc at which the lubricating oil pumps 17 are stopped while the lubricating oil temperature is still low and the lubricating oil surface level tends to become lower than the intake ports 59a of the intake pipings at the lubricating oil pumps 17 during the startup operation, thereby ensuring that the lubricating oil pumps 17 are engaged in operation only under circumstances in which the position of the intake ports 59a can be assumed to be lower than the lubricating oil surface level to effectively prevent cavitation at the lubricating oil pumps 17. Consequently, damage to components such as the lubricating oil pumps 17, the pipings 60 and 61 and the like, attributable to cavitation occurring at the lubricating oil pumps 17 during the startup operation, can be prevented.

In addition, according to the present invention, the startup operation reference speed Vc is set to a value equivalent to 40~60% of normal operation reference speed Vh as a rule of thumb, and, as a result, the lubricating oil pumps 17 can be operated in the optimal state best suited for the actual operating conditions and cavitation can be prevented in an effective manner.

By adopting the embodiment in which the drive motor 18 for the lubricating oil pumps 17 in operation is stopped if the output pressure detected via the pressure sensors 64 is less than the first reference pressure P1 at which air intake may occur at the lubricating oil pumps 17, damage to the lubricating oil pumps 17 attributable to cavitation can be even more reliably prevented in synergy with the control of the speed V explained earlier.

Figure 14:
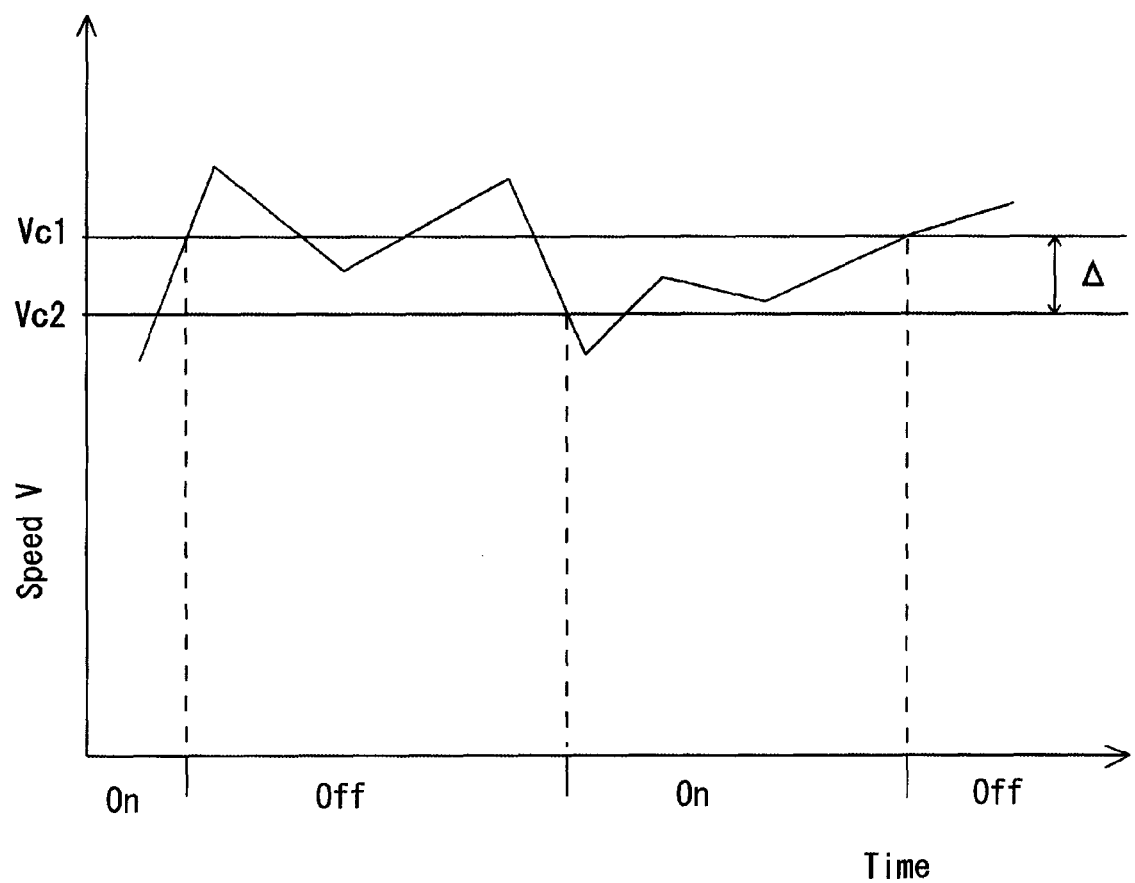
FIG. 14 is a function block diagram of the lubricating oil cooling device achieved in another embodiment of the present invention.

FIG. 14 shows the relationship among the speed V of the traveling motors 16, the reference speed Vc and the ON/OFF state of the lubricating oil pumps 17 observed in another embodiment of the present invention. In this embodiment, a startup operation reference speed Vc1 at which the engagement of the lubricating oil pumps is stopped and a startup operation reference speed Vc2, lower than the reference speed Vc1, at which the engagement of the lubricating oil pumps resumes, are set as the startup operation reference speed Vc in FIG. 8. The startup operation reference speed setting means 74 in the function block diagram in FIG. 8 may set these reference speeds Vc1 and Vc2 individually or it may determine one of the reference speeds, e.g., the reference speed Vc2 (or Vc1) in correlation to the setting for the other reference speed, e.g., Vc1 (or Vc2), simultaneously through arithmetic operation or through a function.

As shown in FIG. 14, even if the vehicle speed (the speed detected via the speed sensors 56) fluctuates frequently, the lubricating oil pumps 17 having been started up are not turned off and then on again, as long as the difference Δ between the reference speeds Vc1 and Vc2 remains within a specific range so as to ensure that the lubricating oil pumps 17 are not started up and turned off repeatedly with excessive frequency and thus enable stable control operation. It is desirable to set the range for the difference Δ between the reference speeds Vc1 and Vc2 to Δ=Vc1−Vc2=β×Vc1 (β=0.1~0.2).

The lower limit of 0.1 to the coefficient β is set by factoring in the error at the speed sensors 56 and the operational delay, and stable control cannot be assured if the lower limit is less than 0.1. In addition, if the upper limit to β is greater than 0.2, high-precision control cannot be assured.

It is to be noted that while the speed of the lubricating oil pumps 17 is adjusted in the embodiment described above by altering the drive frequency of the drive motor 18 in steps during the startup operation, a constant frequency lower than the drive frequency for normal operation may be set as the startup operation drive frequency. As an alternative, the startup operation control means 82 to may drive the drive motor 18 with a drive frequency Z determined as expressed; Z=a+b×(T+c), based upon the detected lubricating oil temperature T provided by the second temperature sensors 65. It is also to be noted that a, b and c in the expression above may be respectively set to 4 (Hz), 0.77 and 20(° C.). The expression presented above was obtained based upon a rule of thumb. In addition, none of the numerical values assumed for the constants a, b and c is determined univocally, but rather, optimal numerical values, selected in correspondence to the piping length, the pump capacities, the size of the drive motor 18 in the particular body, should be assumed for the constants.

The invention claimed is:

1. A traveling speed reduction gear lubricating oil cooling device in a work vehicle, including:
   a tubular wheel mounting sleeve that rotates as one with wheels of the work vehicle;
   a traveling motor used to drive said wheel mounting sleeve;

a reduction gear unit housed inside said wheel mounting sleeve and constituted with a gear mechanism that slows the rotation of said traveling motor and transmits the slowed rotation to said wheel mounting sleeve; and a circulation path and a lubricating oil pump disposed outside said wheel mounting sleeve, via which reduction gear lubricating oil drawn out of said wheel mounting sleeve is cooled at an oil cooler and then made to travel back into said wheel mounting sleeve:

characterized in that said traveling speed reduction gear lubricating oil cooling device comprises:

a speed sensor that detects said speed of said traveling motor;

a reference speed setting means for setting in advance a reference speed Vh at which said lubricating oil pump is stopped in order to prevent air intake at said lubricating oil pump during normal operation and a startup operation reference speed Vc, lower than said reference speed Vh, at which said lubricating oil pump is stopped in order to prevent air intake at said lubricating oil pump during startup operation;

a speed comparison means for comparing said speed V detected by said speed sensor with a startup operation reference speed Vc set for said traveling motor; and a startup operation control means for engaging a drive motor for said lubricating oil pump at a speed lower than a normal operation speed if the detected speed V is lower than said startup operation reference speed Vc and stopping said drive motor for said lubricating oil pump if the detected speed V is higher than said startup operation reference speed Vc.

2. A traveling speed reduction gear lubricating oil cooling device according to claim 1, wherein:

said reference speed Vh and said reference speed Vc are set so as to achieve a relationship expressed as;

$$Vc = \alpha \times Vh (\alpha = 0.4 \sim 0.6).$$

3. A traveling speed reduction gear lubricating oil cooling device according to claim 1, wherein:

a startup operation reference speed Vc1 at which engagement of said lubricating oil pump is stopped and a startup operation reference speed Vc2, lower than said reference speed Vc1, at which the engagement of said lubricating oil pump is resumed, is set as said startup operation reference speed Vc for said lubricating oil pump, by ensuring that a difference $\Delta = Vc1 - Vc2$ satisfies a condition expressed as;

$$\Delta = \beta \times Vc1 (\beta = 0.1 \sim 0.2).$$

4. A traveling speed reduction gear lubricating oil cooling device according to claim 2, wherein:

a startup operation reference speed Vc1 at which engagement of said lubricating oil pump is stopped and a startup operation reference speed Vc2, lower than said reference speed Vc1, at which the engagement of said lubricating oil pump is resumed, is set as said startup operation reference speed Vc for said lubricating oil pump, by ensuring that a difference $\Delta = Vc1 - Vc2$ satisfies a condition expressed as;

$$\Delta = \beta \times Vc1 (\beta = 0.1 \sim 0.2).$$

* * * * *